US012566954B2

(12) United States Patent
Vasilev

(10) Patent No.: US 12,566,954 B2
(45) Date of Patent: Mar. 3, 2026

(54) SOLVING MULTIPLE TASKS SIMULTANEOUSLY USING CAPSULE NEURAL NETWORKS

(71) Applicant: LARALAB GmbH, Munich (DE)

(72) Inventor: Aleksei Vasilev, Munich (DE)

(73) Assignee: LARALAB GmbH, Munich (DE)

( * ) Notice: Subject to any disclaimer, the term of this patent is extended or adjusted under 35 U.S.C. 154(b) by 594 days.

(21) Appl. No.: 17/756,401

(22) PCT Filed: Nov. 27, 2020

(86) PCT No.: PCT/EP2020/083703
§ 371 (c)(1),
(2) Date: May 24, 2022

(87) PCT Pub. No.: WO2021/105405
PCT Pub. Date: Jun. 3, 2021

(65) Prior Publication Data
US 2023/0169331 A1 Jun. 1, 2023

(30) Foreign Application Priority Data

Nov. 27, 2019 (EP) ..................................... 19211811

(51) Int. Cl.
*G06N 3/08* (2023.01)
*G06V 10/764* (2022.01)
*G06V 10/82* (2022.01)

(52) U.S. Cl.
CPC ............. *G06N 3/08* (2013.01); *G06V 10/764* (2022.01); *G06V 10/82* (2022.01)

(58) Field of Classification Search
CPC . G06F 18/24; G06F 18/2431; G06V 2201/03; G06V 40/172; G06V 10/764; G06V 10/82; G06T 2207/20084; G06T 7/0012; G06N 3/08; G06N 3/045; G06N 3/084
See application file for complete search history.

(56) References Cited

U.S. PATENT DOCUMENTS

| | | | | |
|---|---|---|---|---|
| 2016/0148371 A1* | 5/2016 | Itu | ........................... | G16H 50/20 |
| | | | | 382/128 |
| 2019/0114766 A1* | 4/2019 | Song | ...................... | G06T 7/0012 |
| 2020/0342600 A1* | 10/2020 | Sjöstrand | ............... | A61B 6/032 |

FOREIGN PATENT DOCUMENTS

WO WO-2020032325 A1 * 2/2020 ............. A63B 55/61

OTHER PUBLICATIONS

English Translation—WO-2020032325-A1 (Year: 2020).*

(Continued)

*Primary Examiner* — Sumati Lefkowitz
*Assistant Examiner* — Aaron Joseph Sorrin
(74) *Attorney, Agent, or Firm* — DENTONS Durham Jones Pinegar

(57) ABSTRACT

The invention provides a system and method for training artificial neural networks for solving multiple tasks simultaneously, wherein the artificial neural network comprises at least one capsule layer. The invention also provides a system and a method for solving multiple tasks simultaneously, wherein the artificial neural network comprises at least one capsule layer. The invention further provides additional connected aspects.

16 Claims, 5 Drawing Sheets

(56) References Cited

OTHER PUBLICATIONS

International Search Report corresponding to International Patent Application No. PCT/EP2020/083703, mailed Feb. 10, 2021 (3 pages).
Bonheur, S. et al., "Matwo-CapsNet: A Multi-Label Semantic Segmentation Capsules Network," Oct. 2019, 12th European Conference on Computer Vision (ECCV) (9 pages).
Pechyonkin, M., "Understanding Hinton's Capsule Networks. Part IV: CapsNet Architecture," Feb. 2018, Medium.com, retrieved from Internet: https://medium.com/ai%C2%B3-theory-practice-business/part-iv-capsnet-architecture-6a6442217dce (5 pages).
Ahmad, A et al., "3D Capsule Networks for Object Classification from 3D Model Data," Oct. 2018, IEEE 52nd ASILOMAR Conference on Signals, Systems, and Computers, pp. 2225-2229 (5 pages).
Hinton, G. et al., "Matrix Capsules With Em Routing," ICLR 2018 (15 pages).
Sabour, S. et al., "Dynamic Routing Between Capsules," 2017, 31st Conference on Neural Information Processing Systems (NIPS 2017), retrieved from Internet: https://arxiv.org/abs/1710.09829 (11 pages).
Wang, D. et al., "An Optimization View on Dynamic Routing Between Capsules," ICLR 2018 (4 pages).
Bahadori, M. T., "Spectral Capsule Networks," ICLR 2018 (5 pages).
Villman, T. et al., "Machine Learning Reports," 2018, retrieved from Internet: https://www.techfak.uni-bielefeld.de/~fschleif/mlr/mlr_02_2018.pdf (20 pages).
De Sousa Ribeiro, F et al., "Capsule Routing via Variational Bayes," 2019, retrieved from Internet: https://arxiv.org/abs/1905.11455 (9 pages).
Kosiorek, A. R. et al., "Stacked Capsule Autoencoders," 2019, retrieved from Internet: https://arxiv.org/abs/1906.06818 (14 pages).
Hui, J., "Understanding Matrix capsules with EM Routing (Based on Hinton's Capsule Networks)," 2017, retrieved from Internet: https://jhui.github.io/2017/11/14/Matrix-Capsules-with-EM-routing-Capsule-Network/ (34 pages).

* cited by examiner

5

1

INPUT
128x224x3

21

22

128 x 224
20

24-1

25-1

128 x 224
4 x (4 + 1)

23

24-2

128 x 224
4 x (4 + 1)

25-2

24-3

64 x 112
8 x (4 + 1)

25-3

24-4

32 x 56
16 x (4 + 1)

25-4

24-5

16 x 28
32 x (4 + 1)

25-5

24-6

8 x 14
32 x (4 + 1)

40-1

40-2

40-3

16 x 28
64 x (4 + 1)

40-4

35-1

34-1

34-3

32 x 56
48 x (4 + 1)

34-5

64 x 112
32 x (4 + 1)

36-4

9

OUTPUT
128x224x6

128 x 224
20 x (4 + 1)

128 x 224
8 x (4 + 1)

37

34-7

34-9

35-4

34-8

35-3

64 x 112
16 x (4 + 1)

36-3

34-6

36-5

128 x 224
6 x (4 + 1)

34-4

32 x 56
24 x (4 + 1)

36-2

35-2

34-2

16 x 28
32 x (4 + 1)

36-1

20

30

SOLVING MULTIPLE TASKS SIMULTANEOUSLY USING CAPSULE NEURAL NETWORKS

PRIORITY CLAIM

This application is a 35 U.S.C. § 371 National Stage Application of PCT/EP2020/083703, filed on Nov. 27, 2020, which claims the benefit of priority to Ser. No. 19/211,811.5, filed on Nov. 27, 2019, in Europe, the disclosures of which are incorporated herein by reference in their entirety.

FIELD OF THE INVENTION

The present invention relates to improved artificial neural networks, to methods for training such improved artificial neural networks, to systems implementing such improved artificial neural networks, to computer program products and data storage media storing such improved artificial neural networks as well as to a use of such improved artificial neural networks and other aspects.

BACKGROUND OF THE INVENTION

Artificial neural networks, ANNs, are increasingly used in many fields of technology, perhaps most promisingly in the field of medical imaging. For example, an artificial neural network, ANN, may be used to characterize an input image as normal or abnormal, or may segment input images so that structures or organs present in the image are labelled accurately.

Deep artificial neural networks, DNNs, sometimes struggle with the issue that neurons of its deeper layers accurately identify specific structures (e.g. organs or parts of organs), such as the presence of a human face in the image, but do not take the spatial positions of its parts within the image into account. Thus, a human face may be registered as such by a deep neuron even if the picture has been tampered with and the eye is, for example, located at a chin of a person.

Moreover, if the object in an image is slightly tilted in a specific direction, the deep neurons (or: nodes) may struggle with the recognition of previously clearly recognizable features. This is because convolutional networks, for example, often learn detectors for features such as edges in their earlier layers, wherein the orientation of the edges is different for different neurons. Thus, when the same image is tilted in different directions, different neurons in the earlier layers are activated. In order to recognize the same features in tilted images, the deeper neurons thus have to be trained to recognize them as well, usually by simply adding more training data. For example, data augmentation may be performed by tilting labelled training images (i.e. images for which labels are available for training) to produce additional training images.

However, this is a sort of "brute force" solution that requires the network to have more neurons and does not make use of the fact that it is actually the same feature in the differently tilted images that is recognized.

One method to deal with these issues is using so-called capsule networks. Capsules are among the most recent and promising structures proposed for improved deep neural networks, DNNs. A capsule is a group of neurons representing an object or an object part including its variants (position, size, orientation, deformation, etc.). Due to their design, capsule networks are capable of preserving more information about part-whole relationships in the data than the traditional convolutional neural networks.

In a capsule network, low-level capsules cast votes for the next-layer capsules poses. Usually, these votes are generated via learned transformations (e.g. via learned linear transformations) of the low-level capsules, e.g. of capsule layer i. Then based on these votes, the outputs of the next-layer capsules of capsule layer i+1 are computed during a so-called routing procedure.

The routing procedure is usually similar to a fuzzy clustering algorithm. The next-layer capsule in layer A+1 will be activated only if the votes from the previous layer A are clustered tightly, i.e. if their outputs are similar according to a given similarity metric. In other words, the output of a plurality of capsules which may each relate to an individual feature may be used as input to a capsule of a higher level which may then detect whether the individual "poses" (i.e. properties) align such that the capsule of the higher level detects a composed object.

Capsule networks have been proposed by Geoffrey Hinton et al., for example in "Geoffrey Hinton, Sara Sabour, and Nicholas Frosst. Matrix capsules with em routing. 2018", hereafter cited as "Hinton et al.". Therein, "em" stands for "expectation maximation".

Dynamic routing as an alternative to the em routing procedure described in "Hinton et al." has been proposed in: "Sara Sabour, Nicholas Frosst, and Geoffrey E Hinton. Dynamic routing between capsules. In: Advances in Neural Information Processing Systems 30, pages 3856-3866. Curran Associates, Inc., 2017", hereafter cited as "Sabour et al.".

In the scientific publication "Dilin Wang and Qiang Liu. An optimization view on dynamic routing between capsules, 2018", an optimized dynamic routing procedure is described.

A procedure called "spectral routing" is proposed in the scientific publication "Mohammad Taha Bahadori. Spectral capsule networks. 2018".

The so-called Learning Vector Quantization, LVQ, routing is proposed in "Thomas Villmann and Frank-Michael Schleif, editors. Machine Learning Reports February 2018, volume 1 of Machine Learning Reports, 2018. ISSN: 1865-3960 http://www.techfak.uni-bielefeld.de/~fschleif/m1r/m1r 02 2018.pdf."

Another routing procedure is described in the scientific publication "Capsule Routing via Variational Bayes. 2019", available e.g. at https://arxiv.org/pdf/1905.1145.pdf.

A new approach to group neural network features in capsules is proposed in "Adam R. Kosiorek and Sara Sabour and Yee Whye Teh and Geoffrey E. Hinton. Stacked Capsule Autoencoders", available e.g. at https://arxiv.org/pdf/1906.06818.pdf, which will hereafter be cited as "Kosiorek et al.".

The internet resource https://jhui.github.io/2017/11/14/Matrix-Capsules-with-EMrouting-Capsule-Network/gives an introduction into capsule networks.

However, one issue with capsule networks, as with many other types of artificial neural networks, ANNs, persists: the internal states of the network, from which the final output of the network is derived, are usually non interpretable by humans and so it remains to some degree unverifiable in which way the final result of a task performed by the network (such as a classification, prediction or a diagnostic task) was reached.

Furthermore, it is usually not controllable which feature(s) of which internal state encodes which information. Moreover, in the event that two different properties of an entity are of importance, it would be beneficial for interpretability by humans if each property was described by a single corresponding feature. However, it is often irrelevant to the network whether each of two features describes one distinct property clearly, or whether each of the two features describes a superposition of the two properties, in the same way as it is mathematically irrelevant which two linear independent vectors are used to describe a two-dimensional vector.

In addition, some important property of the input data (which may be evident to humans) may be left unlearned by the artificial neural network.

Furthermore, the input data to DNNs, such as images, often describe a system with interdependent properties, with two or more properties of importance. DNNs according to the state of the art are usually trained to only determine one property and thus only to solve one task which can be a disadvantage as described in more detail in the following examples. The artificial neural networks, ANNs, in particular DNNs, claimed, described and used in the present invention, do not have this disadvantage.

One example is the segmentation and property detection (e.g. detection of an abnormality or detection of a disease) of a heart valve within a medical image. For example, the aortic valve in the human heart usually consists of three leaflets. However, in a certain population it only consists of two leaflets ("bicuspid valve"), further sub-divisible into different types, which can be of high medical relevance. A DNN according to the prior art, trained to segment an aortic valve within a medical image, may fail to segment a bicuspid valve and/or may tend to segment three leaflets for a bicuspid valve within a medical image. The segmentation of a heart valve is relevant for the detection of a structural property such as a property indicating a bicuspid valve. A DNN able to capture a system with such interdependent properties would be advantageous for accurately solving the described tasks.

Within a medical image, a vessel (in particular a blood vessel, e.g. a coronary artery including potential lesions), a tissue (e.g. heart muscle) and a heart chamber may be segmented using a DNN. Each of the segmented organs (or, more generally: segmented structures) may be used, in the state of the art, separately as an input to a respective separate algorithm, e.g. to estimate a flow in the vessel, a tissue property of the heart muscle and/or a functional property of the heart chamber.

In reality, however, the flow in the coronary vessel influences the heart muscle tissue which influences the function of the heart chamber which influences again the flow in the coronary vessel. The properties may even include information to potentially enable a more accurate segmentation of the organs or parts of organs, or simply of any structure in general. An improved DNN being able to capture interdependencies while solving different tasks simultaneously would be beneficial and lead to higher accuracies for the different tasks, and may in some cases enable solving some tasks for the first time.

Another example is segmentation and estimation of the depth map of an image. Objects belonging to different classes may be located within a different distance from a camera. Thus this distance information is useful for distinguishing between different classes and usage of this information can lead to more accurate segmentation results, especially near the borders between the classes. Due to the same reason, information about boundaries of classes (and/ or the classification of individual pixels/voxels) may improve the depth map estimation accuracy. Thus an improved DNN is advantageous because it is solving both tasks simultaneously and with a higher accuracy.

SUMMARY OF THE INVENTION

It is therefore one of the objects of the invention to provide an improved method for training an artificial neural network, ANN, as well as an improved artificial neural network, ANN, which preferably comprises learning human-interpretable features. Further objects are to provide useful aspects of such methods and systems.

According to a first aspect, the present invention provides a computer-implemented method for training an artificial neural network, ANN, comprising the steps of:

provide an ANN comprising at least one capsule layer;
    wherein each capsule of the at least one capsule layer is configured to output a pose array; and training the artificial neural network, ANN;
wherein, during training, labelled training samples are provided as (training) input to the artificial neural network, ANN, and the artificial neural network, ANN, is configured to generate an output array based at least on the (training) input and based on learnable parameters of the artificial neural network, ANN;
wherein during training the learnable parameters are updated to optimize a loss function;
wherein the loss function penalizes differences between at least one value of the output array generated based on at least one, preferably each, training sample and a corresponding ground truth label for said at least one value of the output array of (or: for) the corresponding training sample.

The labelled training samples further comprise a ground truth label for at least one supervised entry of the pose array of at least one capsule of at least one of the at least one capsule layer, a supervised entry being an entry for which the loss function penalizes differences between the ground truth label for said at least one supervised entry for each training sample and the at least one supervised entry generated based on the corresponding training sample, such that the artificial neural network, ANN, is trained to provide, based on (or: in form of) the output array, a result for at least one first task and to further provide, based on (or: in form of) the at least one supervised entry, a result for at least one second task.

More than one supervised entry may contribute to a single second task. In case that more than one second task is to be solved, a supervised entry may be provided in the ANN for each of these second tasks, or at least for a sub-group of the plurality of second tasks.

In particular, said at least one entry may itself be the result of the second task, i.e. a numerical answer to a correspondingly formulated second task. For example, the entry may indicate a probability, a degree, a percentage, a depth and/or the like.

Some or all of the ground truth labels (or: ground truth values, or simply: ground truths) may be actually true values, e.g. correct depth map values of each pixel/voxel of a training sample (i.e. a training image). Alternatively or additionally, some or all ground truth labels may be desired or estimated values.

The loss function to be optimized may in particular be a loss function that is to be minimized. In other words, training the artificial neural network, ANN, may comprise iteratively updating learnable parameters of the artificial neural network, ANN, in order to minimize the loss function.

A capsule layer is a layer of an artificial neural network, ANN, that comprises, and preferably consists of, capsules. All of the artificial neural networks, ANN, described herein are preferably deep (artificial) neural networks, DNNs, i.e. they comprise at least one hidden layer and preferably a plurality of hidden layers. In some advantageous variants, at least one supervised entry may be output by a capsule in a hidden capsule layer of a DNN.

A capsule is a group of artificial neurons (or: nodes) whose outputs represent different properties of the same entity (object or object part). The outputs of these neurons grouped together comprise what is often called the pose (or instantiation parameters) of the entity. Herein we will designate the data structure representing the pose as "pose array". The term "array", as it is used herein, may refer to a scalar ($1 \times 1$ array), to a vector ($n \times 1$ array), to a matrix ($n \times m$ array) or to a higher-dimensional tensor such as an $n \times m \times k$ array or the like.

The output to a regular artificial neuron (or node) of a regular, non-capsule artificial neural network, ANN, is usually a scalar. By contrast, the output of a capsule usually is the pose array. Traditional artificial neural networks usually use simple non-linearities where a non-linear function is applied to the output of a weighted sum of features. Sometimes a softmax function is used to convert the feature values of one layer into probabilities. The structure of capsules allows using more sophisticated non-linearities to convert pose arrays of all capsules in one layer into the pose arrays of capsules in the next layer. These non-linearities can be implemented by e.g. the routing procedures.

The so-called pose is not necessarily the actual spatial pose of the entity (not even in the case of recognizing objects in input images, although it can be just that); rather, the pose array is an array of features (the "pose array features") that the network has learned to produce to describe useful properties of a specific entity. Entity properties encoded in the "pose" may include its approximated position, orientation, transformation, size and so on, but may also comprise rotations in the vector space of such properties, or otherwise encoded features.

Thus, a capsule that has, during training, gained for example the ability to recognize a human face in an input picture may be able to recognize a face even when it is tilted, stretched, filtered with regard to a specific shape and so on, and may output useful properties of the detected object or object part. It may not detect a tampered face as a face, e.g. with an eye at the chin of a person.

When the capsule network works properly, the activation probability of the capsule is invariant to the object variants, whereas the poses of the capsule are equivariant—they represent the extrinsic coordinates of the object on the manifold of its variants.

A capsule can learn to detect more than one class of entities since the number of capsules in a capsule layer is necessarily finite and the number of possible classes can be infinite. The difference between the classes detected by one capsule can be encoded in the pose array of the capsule. Then the differences in the pose arrays can lead to different votes for the next-layer capsules. This behavior is advantageous since part-whole relationships between slightly different low-level entities and the same high-level entity can differ. Herein, a comparatively "low level" is a level comparatively closer to an input level of an artificial neural network, and a comparatively "high level" (e.g. a "next level") is a level comparatively closer to an output layer of the artificial neural network.

The transformation from the pose of any capsule to that capsule's vote for a next-layer capsule are learned during training. So the network learns how the pose of a high-level entity is connected to the poses of its parts. The routing procedure may contain a few trainable parameters but is usually independent of the training dataset. Note that not (necessarily) all capsules in layer i take part in the activation of all capsules in layer i+1.

For example, consider five capsules in layer i detecting noses, eyes, mouths, wrists and forearms, and two capsules in layer i+1 detecting faces and hands. Since wrist and forearm are not parts of the face, their pose arrays are not important for the pose array of the face. Thus, during the routing procedure, votes from wrist and forearm will not be clustered together with the votes from nose, mouth and eyes. Usually, routing procedures include the computation of these assignment probabilities between the respective capsule layers.

Capsule layers endow capsule networks with several useful features:

Approximate equivariance under transformations of entity properties

Robustness to adversarial attacks

Explicit learning of part-whole relationships between network layers

One of the main reasons for the complete, or approximate, equivariance of the capsules under transformations is that the activation of a capsule is based on the proximity of the votes made by the lower-level capsules. When the low-level capsule feature map is transformed (e.g. rotated in some n-dimensional space), similar transformations (rotations) are applied to the poses of the capsules of this feature map. This implies that the votes of these capsules for the deeper-layer capsules (produced by vector transformations) will change in a similar way. Similar relative positions of votes in "vote space" are likely to cause similar routing. This property allows the capsule network to achieve equivariance under changes in the entity parameters.

The design of the capsule layer also allows the capsule network to be more robust, e.g. to adversarial attacks. In the example of face detection, the votes from a capsule trained to detect a nose and from a capsule trained to detect a mouth, respectively, will only agree if their scale factors and rotation angles match natural properties of the face learned during training. Otherwise, the deeper-layer face capsule will have a low activation probability.

Part-whole relationships are reflected more fully in capsule networks than in regular artificial neural networks in part because the routing procedure in a capsule layer is similar to a fuzzy clustering where the votes of the capsules at layer i can be seen as data points that are grouped (with outlier rejection) to capsules at layer i+1. After the forward network pass, all the capsules that participated in the decision-making can be traced back to the first capsule layer. This property can be useful to design novel network architectures for different machine learning tasks including simultaneous segmentation and any specific property estimations, for example as described in the foregoing and following.

For the present invention, any known routing procedure for capsule layers, i.e. em routing, dynamic routing, optimized dynamic routing, spectral routing, LVQ routing or routing via variational Bayes and so on or any other known way of introducing capsules into the neural network, e.g. stacked capsule autoencoders, may be used.

It should be kept in mind that in the prior art, the capsules will not actually output spatial poses at all but an encoded "pose array" with any kind of information that has turned out to be useful during training. By contrast, using the present invention, the supervised entry can be trained to represent a directly interpretable result. As one advantage, this means that the designers of the artificial neural network, ANN, are able to use their a priori knowledge about a particular task to force the artificial neural network, ANN, to consider a particular property indicated by the supervised entry, and/or to at least partially impose a certain structure.

This will not only increase the accuracy of the artificial neural network, ANN, when performing its tasks but can also provide an output of at least one capsule that is interpretable, e.g. a numerical property, a value that leads to a decision or prediction and/or the like. This can be used to verify the result of the artificial neural network, ANN, and/or to have the artificial neural network, ANN, solve an additional task (in addition to the one already being solved, as is usual, by its output) based on the supervised entry. In the following, a variety of advantageous applications and variants will be described. Particularly advantageous embodiments and variants are subject of the dependent claims.

In some advantageous embodiments, refinements, or variants of embodiments, the first task comprises, or consists of, a classification task for classifying the input into one of a plurality of classes. These tasks are especially suited for being solved using a capsule network of the proposed architecture, i.e. with a supervised entry.

Additionally or alternatively, the first task may comprise, or consist of, a segmentation task for classifying at least one spatial location of the input into one of a plurality of classes (or for segmenting an input image). Preferably, the segmentation task includes classifying a plurality of spatial locations (in some cases all of the spatial locations) into one of the plurality of classes. For example, one or more pixels or voxels of an input image (2-dimensional, 3-dimensional or even higher-dimensional) may be classified into different classes. For instance, when the input is a medical image, one or more pixels or voxels (or even all of them) may be classified into classes identifying different organs or the background within the image. The input image may comprise spatial and/or temporal dimensions. For example, the input image may be a 3D spatial plus time image, e.g. ECG gated CT, MRI, ECHO and/or the like.

The input image, or at least one original medical image on which that input image is based on (or: is generated from), may e.g. be a computed tomography scan (CT scan), in particular a CT scan produced without contrast agent ("non-contrast CT scan") or a CT scan produced with a total dose of less than 50 ml of contrast agent, preferably less than 30 ml, more preferably less than 20 ml ("ultra-low contrast").

Such scans are usually less stressful for the body of a patient but produce less contrasts between shades of gray. For the human eye and mind and for currently available computer implemented image segmentation methods shapes in such a CT scan produced without contrast agent may be effectively indistinguishable because the human visual processing only is able, or respectively available computer implemented methods only are able, to process visual differences with a certain minimum contrast. The methods and systems of the present invention on the other hand make it possible to process even such kinds of images.

In some advantageous embodiments, refinements, or variants of embodiments, the at least one capsule layer comprising the supervised entry is provided at the very end of the network, as the classification layer. The activation (or grouping) of said layer will then give the result of the classification or regression task.

In some advantageous embodiments, refinements, or variants of embodiments, the at least one capsule layer is the output layer of the artificial neural network, ANN.

In some advantageous embodiments, refinements, or variants of embodiments, the artificial neural network, ANN, comprises only a single capsule layer, preferably a single capsule layer as a final layer of the artificial neural network, ANN.

The at least one capsule layer (in some advantageous variants only a single capsule layer) is configured to have at least N capsules per input node of an input layer of the artificial neural network, ANN, or at least N capsules for each of the at least one spatial locations of the input (e.g. for each pixel or voxel of an input image).

At least one (preferably each) capsule of an output layer realized as a capsule layer has a corresponding activation probability indicated by the pose array, or an explicit activation value output in addition to its pose array. As an example for an activation value implicitly given by the pose array, the activation probabilities may be calculated based on the values of the pose array of each corresponding capsule of the output layer, for example based on a norm of the pose array.

The dimension of the output of a capsule will herein be sometimes described as $(n+1)$, wherein "+1" refers to an explicit activation probability, an "n" refers to the features of the pose array which will also be designated as "pose property features" or "pose array features". In other words, a pose array may e.g. consist of pose property features and the activation may be given by the norm of these pose property features, or the output of a capsule may consist of n pose property features and one explicit activation probability value, thus having dimension $n+1$ (or, as a vector, dimension $(n+1) \times 1$).

The training samples may be selected deliberately or randomly from a larger set of available training samples. The training samples may each comprise both (at least one) ground truth label for the at least one value of the output array (or, in other words, ground truth labels regarding the first task) as well as (at least one) ground truth label for said at least one supervised entry. In this case, each training sample is used to train the artificial neural network, ANN, regarding both the first and the second task. However, in other variants, some of the used training samples may only comprise ground truth labels for the at least one value of the output array, and some of the used training samples may only comprise ground truth labels for the at least one supervised entry. In these variants, there may or may not be training samples which comprise both kinds of ground truth labels.

The loss function may penalize differences between the activation probability values of the capsules of the at least one capsule layer generated based on each training sample and corresponding ground truth labels of a plurality of classes of the training sample or for at least one spatial location of the training sample.

The loss function L may be a weighted sum of two individual losses, $L = a*L1 + b*L2$, wherein a and b are chosen weights (hyperparameters), and L1, L2 are individual losses regarding the first and the second task, respectively. Whenever a training sample has no label for the first task, then $L = b*L2$ for the training of the artificial neural network, ANN, based on said training sample and vice versa, i.e. whenever a training sample has no label for the second task, then $L = a*L1$ for the training of the artificial neural network, ANN, based on said training sample.

In some advantageous embodiments, refinements, or variants of embodiments, at least one (or exactly one) of the at least one capsule layer is configured to have at least N capsules for the input or at least N capsules for each of at least one spatial location of the input, wherein the output of each capsule of the at least one of the at least one capsule layer comprises an activation probability value; and wherein, for training the artificial neural network, ANN, with respect to the result for the at least one first task, the loss function penalizes differences between the activation probability values of the capsules of the at least one of the at least one capsule layer generated based on each training sample and corresponding ground truth labels for each (or at least one) of a plurality of classes N of the training sample or for at least one spatial location of the training sample.

In some advantageous embodiments, refinements, or variants of embodiments, the second task comprises, or consists of, a task for determining at least one property of at least one of the plurality of classes. For example, when the classes refer to objects to be determined, the second task may comprise or consist of a task for determining at least one property of said object when it is detected, for example its spatial orientation, or another property. When the objects to be determined are internal organs or parts of internal organs, the at least one property may refer to a health state of said organs or parts of organs, e.g. to the presence of an abnormality, to the presence of a disease, to the presence of a lesion, to a type of a lesion, to the presence of a blockage in a blood vessel and/or the like.

In some advantageous embodiments, refinements, or variants of embodiments, the input is at least one input image (preferably a medical image), and the first task comprises, or consists of, an image classification task of the input image and/or an image segmentation task of the input image. The second task may comprise generating a depth map for at least a part of the at least one input image. Thus, the artificial neural network, ANN, may be trained such that the at least one supervised entry indicates (or: contains, or: consists of) a depth information. Then, when there is a plurality of capsules for each pixel or voxel of the input image, each capsule may output a corresponding pose array of which at least one entry indicates a depth (or: depth map value) of the corresponding pixel or voxel.

The depth map may cover only a part (or: portion) of the at least one input image, for example only specific objects that have been classified by the first task. In other variants, the depth map may cover the complete input image, i.e. may provide a depth map value for every pixel/voxel of the input image.

The training data may consist of training samples which may then comprise an image (e.g. a medical image) and (at least one) ground truth label for a plurality of pixels or voxels regarding their segmentation (desired result of segmentation task) for use in the loss function for supervised learning during training.

The training data may further comprise a ground truth depth map for the plurality of pixels or voxels for use in the loss function for supervised learning during training.

In case of the first task being a classification task, the training data may then comprise, or consist of, an image (e.g. a medical image), a ground truth label for the classification of the image (desired result of classification task) for the supervised training of the ANN regarding the first task, i.e. the output of the artificial neural network, ANN, and a ground truth label for the depth value of the class or object being detected in the image for the supervised training of the ANN regarding the second task, i.e. the supervised entry.

In some advantageous embodiments, refinements, or variants of embodiments, in particular in case of the first task being a segmentation task, the artificial neural network, ANN, is U-shaped with an encoder branch and a decoder branch. Skip connections may be applied, both within the encoder branch and/or the decoder branch; there may also be one or more skip connections between the encoder branch and the decoder branch. Skip connection represent a shortcut along which information may propagate along another way than along the longest possible way between the input layer and the output layer. For example, a feature map may be concatenated, via a skip connection, with another feature map; in particular, a (intermediate) feature map of an encoder branch of an artificial neural network, ANN, may be concatenated with a (intermediate) feature map of a decoder branch of an artificial neural network, ANN.

Similarly (and in particular in case of the first task being a segmentation task), the second task may comprise a task of determining for each pixel or voxel (or alternatively for each classified spatial location), or in case of the first task being a classification task: for each class, of the input image whether it indicates a certain symptom or abnormality, for example a calcification and/or lesion probability for each pixel/voxel so as to determine the state of health of e.g. blood vessels.

The at least one capsule layer may be positioned in different parts of the artificial neural network, ANN:

1. The encoder branch may comprise several capsule layers stacked one after another. Introducing several respective capsule layers may introduce equivariance to intermediate layer features (pose arrays) of the encoder branch which will improve results of the encoder. The encoder branch can then be followed by a standard decoder branch consisting of several upsampling and convolutional layers, or by any of the variants for the decoder branch described in the following.

2. The at least one capsule layer may also be integrated into the decoder branch of the artificial neural network, ANN. This is advantageous for many architectures in which the decoder branch is able to extract more complex features than the encoder branch due to the fact that its layers are deeper in the artificial neural network, ANN, and have a bigger receptive field. As with the encoder branch, there are also two main option for the decoder branch: whether to use only one capsule layer or multiple capsule layers. The case with multiple capsule layers is preferred, in particular the case with multiple capsule layers in the encoder branch and/or multiple capsule layers in the decoder branch.

3. Similarly to item 1 above, introducing multiple capsule layers in the decoder branch may render also intermediate (hidden, or latent) features (or: pose arrays) of the decoder branch equivariant.

4. It is also possible to provide both an encoder branch with capsule layers as well as a decoder branch with capsule layers.

In some advantageous embodiments, refinements, or variants of embodiments, the artificial neural network, ANN, has a decoder branch that shares at least two of its last capsule layers with at least two first capsule layers of the encoder branch. The output of the decoder branch in this case can be calculated using a procedure similar to a so called traceback pipeline described in the paper "https://arxiv.org/pdf/1901.02920.pdf". In this case when the output of the encoder branch is calculated, capsules at the last capsule layer of the encoder branch with high activation probability are known. During the routing procedure not all of the capsules from the lower layer are assigned to the capsules from the next layer.

Thus, it is possible to detect only those capsules from the first layer shared between the encoder and the decoder that took part in activating the capsules of the last layer shared between the decoder and the encoder. These selected capsules from the first shared layer are then input to the rest non-shared layers of the network decoder branch.

In general, the encoder branch comprises downsampling layers. The main purpose of downsampling layers is to decrease the spatial size of the feature maps in order to reduce the overall network size and to increase the receptive field of high-level (deeper) convolutional capsule layers. Typically, downsampling layers increase the number of channels.

At least any of the following downsampling layers may be used in the encoder branch as described herein:

d1. Strided capsule layer: In a capsule layer stride can be applied in two different steps: if a capsule feature map contains only one capsule at each spatial location, then during the transformation strided convolution can be used; otherwise, for multiple capsule channel feature maps, the routing procedure can be done over capsules within a specific kernel that can be moved over the feature map with a stride bigger than one.

d2. Average pooling: If capsules pose arrays including the activation probabilities are stacked along the channel dimension in a feature map, then a traditional average pooling can be used without breaking the internal structure of the capsules. In this case, produced capsules will have pose property features and activation probabilities being average of the poses property features and activation probabilities, respectively, of the capsules within pooling kernel. With this approach capsules with small activation probabilities will contribute with the same factor as capsules with high activation probabilities into generating new capsules. To avoid this, weighted pooling can be applied, with the weights proportional to the activation probabilities of the capsules.

d3. Max pooling: If max pooling is applied to the capsule feature map in the same fashion as the average pooling (item d2 above), then the internal structure of the capsules can be broken. This may happen due to the fact that the pose arrays, or pose property features (having maximum value within the pooling kernel) can be taken from different capsules. In order to avoid this undesired behavior, max pooling can be done by selecting the capsules with the highest activation probability within the pooling kernel.

In general, the decoder branch comprises upsampling layers. The main purpose of upsampling layers is to increase the spatial size of the feature maps. Typically, upsampling layers decrease the number of channels.

At least any of the following upsampling layers may be used in the decoder branch as described herein:

u1. Nearest neighbor upsampling: Repeats each capsule row and column of the capsule feature map n times, where n is the upscaling factor.

u2. Bilinear upsampling: Uses a weighted average of the four nearest capsule centers. If capsule vectors and activation probabilities of the capsule feature map are stacked as channels in a traditional neural network, bilinear upsampling can be directly applied channel-wise. In this case, new capsules whose pose arrays or pose property features are the weighted average of those of surrounding capsules will be produced. In such layers, capsules with small activation probabilities will contribute the same as the capsules with high activation probabilities (which the network is highly confident about).

u3. Capsule bilinear upsampling: To avoid the issues described above in item u2 which may in some cases be inconvenient, the average of the pose arrays can be calculated, taking into account the activation probabilities. For example, the pose arrays or pose property features of each capsule may be weighted, when generating the next feature map in the upsampling, with their respective activation probability.

u4. Transposed convolution: With capsule vectors and activation probabilities stacked along the channel dimension of the neural network feature map, transposed convolutions, commonly used as upsampling layers in ANNS, can be applied.

u5. Transposed capsule layer: In the transposed convolution approach for capsule upsampling according to item u4 above, a capsule feature map is treated as a traditional feature map of a convolutional neural network. This can cause the capsules to be "destroyed" after transposed convolution layer. In order to avoid this, one can design a "transposed capsule layer" as discussed, e.g., in "Rodney LaLonde and Ulas Bagci. Capsules for object segmentation, 2018. arxiv: 1804.04241.". Such a layer would behave like a normal capsule layer with transformation and routing operations, but the spatial size of the feature map would be increased by using transposed convolutions with a stride during transformation (for feature maps with one capsule channel) or routing (for feature maps with multiple capsule channels).

u6. Resize capsule layer: an H×W×N capsule feature map of size H×W with N capsules at each spatial location can be encoded as a H/2×W/2×4N capsule feature map. Thus in order to increase the spatial size of the capsule feature map by the factor of two, one could at first apply a capsule layer which increases the number of capsule channels by the factor of four and then reshape the produced feature map. This approach does not affect the internal structure of the capsules, but introduces additional trainable parameters into the network.

It is preferred that as downsampling layers strided capsule layers (item d1 above) are used, and that as upsampling layers bilinear upsampling layer (item u3 above) are used. On one hand, these are among the least complex layers and do not introduce additional trainable parameters to the network, and on the other hand they do not suffer from checkerboard artifacts and do not break the layout of the features inside the capsules. Thus, if herein a downsampling or convolutional capsule layer is described, it shall be understood that this may in particular be a strided capsule layer.

Preferably, the encoder branch comprises at least one capsule layer comprising a first number of capsules and/or the decoder branch comprises at least one capsule layer comprising a second number of capsules. It has been found by the inventors that it is preferred that the encoder branch comprises a consecutive series of at least two (more preferred at least three, even more preferred at least four, still more preferred at least five) convolutional capsule layers.

It is also preferred that the decoder branch comprises a consecutive series of pairs of an upsampling (or: deconvolutional) capsule layer followed directly by a convolutional capsule layer. In preferred variants, the decoder branch comprises at least two such pairs, preferably at least three such pairs, more preferably at least four such pairs.

In some advantageous embodiments, refinements, or variants of embodiments, the at least one capsule layer is implemented with Expectation Maximization (em) routing, or dynamic routing, or spectral routing, or Learning Vector Quantization routing or routing via variational Bayes (or any of their variants). Alternatively, stacked capsule autoencoders are used, for example as they have been described in "Kosiorek et al.", which is hereby incorporated by reference.

According to a second aspect of the present invention, a computing system for providing results for at least a first task and a second task is provided, wherein the system comprises a computing device configured to implement a trained artificial neural network, ANN, the trained artificial neural network, ANN, comprising at least one capsule layer,
    wherein each capsule of the at least one capsule layer is configured to output a pose array;
    wherein the trained artificial neural network, ANN, is further configured to receive an input and to generate, based on the input, an output array;
    wherein the trained artificial neural network, ANN, is configured to provide, based on the output array, a result for at least one first task and to further provide, based on at least one entry the pose array of at least one capsule of at least one of the at least one capsule layer, a result for at least one second task. In particular, said at least one entry may itself be the result of the second task, i.e. a numerical answer to a correspondingly formulated second task. For example, the entry may indicate a probability, a degree, a percentage, a depth and/or the like.

Preferably, the second task is used to determine a property of a result of the first task, for example a property of an object detected by the first task, a property of a pixel belonging to a segmentation according to the first task and/or the like.

The trained artificial neural network, ANN, may in particular be trained or may have been trained using the method according to the first aspect of the present invention. Thus, any properties or structural details regarding the artificial neural network, ANN, of the computing device according to the second aspect of the present invention also relate to properties of the artificial neural network, ANN, provided and trained in the method according to the first aspect of the present invention. In particular, any option, variants or modifications described herein with respect to the artificial neural network, ANN, may similarly apply to the artificial neural network, ANN, being trained in the method according to the first aspect as well as to the artificial neural network, ANN, used in the computing device according to the second aspect.

That entry (which is being termed the "supervised entry" in connection with the training method described in the foregoing) may in particular be an entry in a pose array of a capsule in a final (i.e. last) capsule layer of the artificial neural network, ANN, wherein the pose arrays of that final capsule layer are then input into a grouping layer in order to produce the output array of the artificial neural network, ANN. In some alternatives, a supervised entry may be an entry in a pose array of a capsule layer in a next-to-last, or any other capsule layer of the artificial neural network, ANN.

Thus, the described computing system is able to solve two tasks simultaneously, wherein both tasks profit from the solving of the respective other task in that the information used for the solving of either task and the information gained in solving that task can be used for solving the respective other task.

In some advantageous embodiments, refinements, or variants of embodiments, the input received by the trained artificial neural network, ANN, is at least one medical input image such as a computed tomography (CT) image, a magnetic resonance (MR) image, an x-ray image, an ultrasound image and/or the like. The medical input image may be a 2-dimensional image, a 3-dimensional image or even a 4-dimensional image (i.e. a time series of 3-dimensional images, or a video). Correspondingly, the artificial neural network, ANN, of the computing system is configured to receive such an input.

The first task may comprise a medical image classification task on the medical input image and/or a medical image segmentation task on the medical input image.

In some advantageous embodiments, refinements, or variants of embodiments, the second task comprises generating a depth map for at least part of the at least one medical input image, for example for pixels/voxels of the medical input image that have been classified into a particular class. In some variants, the depth map is generated for all of the pixels/voxels of the medical input image, i.e. a depth map value for each pixel/voxel is provided by a corresponding supervised entry for each pixel/voxel. Depth maps are, for example, especially useful if the medical input image is an X-ray image or an ultrasound image.

In some advantageous embodiments, refinements, or variants of embodiments, the second task comprises a detection of an abnormality and/or disease within the input, such as a blood clot, a tumor, ischemic tissue or necrotic tissue. The abnormality and/or disease may be detected within the entire input or within at least part of the input, for example within a particular segmented region, i.e. a group of pixels that has been labelled, by the artificial neural network, ANN, to belong to one particular class, for example a specific organ.

In some advantageous embodiments, refinements, or variants of embodiments, the at least one second task comprises an estimation of at least one blood flow characteristic (e.g. a flow estimation and/or a pressure estimation) of and/or within at least one blood vessel within the input or for at least one pixel/voxel of such a blood vessel within the input, wherein the input is preferably an input image, in particular a medical input image such as a CT image.
    Preferably, the second task comprises at least one of:
    an estimation of a flow rate;
    an estimation of a flow velocity;
    an estimation of a pressure;
    an estimation of a fractional flow reserve (FFR);
    an estimation of a pressure gradient (for example at or about a heart valve); and/or
    an estimation of a flow index (flow rate per cross-sectional area; for example at a heart valve).
    Thus, the first task may be a segmentation task which may classify pixels/voxels of the input image into background or one or more classes, wherein at least one of the classes corresponds to a blood vessel. The term "blood vessel" is used herein for any organic portion that carries blood such as veins or arteries but also chambers of the heart. Then, the at least one second task may estimate the flow and/or pressure in portions of the input image that are classified as blood vessels and/or estimate the flow and/or pressure for each individual pixel/voxel of such portions.

In some advantageous embodiments, refinements, or variants of embodiments, the at least one second task comprises at least an estimation of a tissue characteristic (preferably for muscle tissue, more preferably for heart muscle tissue) of at least one tissue within the input image (preferably a medical input image such as a CT image). The second task may comprise any one of:

an estimation of a mechanical property (such as strain or stress);

an estimation of an electrical property;

an estimation of a viability property;

an estimation of a perfusion; and/or an estimation of ischemia.

The first task may, e.g., be a segmentation task which may classify pixels/voxels of the input image into background or one or more classes, wherein at least one of the classes corresponds to an electrically activatable tissue such as myocardial tissue. Then, the at least one second task may estimate the activation in portions of the input image that are classified as such tissue and/or estimate the activation for each individual pixel/voxel of such portions.

In some advantageous embodiments, refinements, or variants of embodiments, the at least one second task comprises estimation of the corners of object bounding boxes (in 2 dimensions and/or 3 dimensions) of at least one object (or class instance) in an input image. For example, for a 2-dimensional image with 2-dimensional bounding boxes, four supervised entries may be provided for this second task, such as:

x value and y value for top left corner of the bounding box and x value and y value for lower right corner of the bounding box;

x value and y value for top left corner of the bounding box, extent of bounding box in x direction and extent of bounding box in y direction; and/or the like.

In these variants, the first task comprises detecting at least one object within the input image (optionally also classifying the at least one detected object), for which the second task is then to determine the bounding boxes. This is one example of a second task that determines a property of a result of the first task.

In some advantageous embodiments, refinements, or variants of embodiments, the first task comprises detection and/or localisation of an abnormality and/or disease within the medical input image, and the second task comprises determining and/or estimating a property of the detected and/or localized abnormality or disease, e.g. a classification of a type of the abnormality or disease. Abnormalities or diseases may include, for example, tumors, lesions, and/or structural and functional abnormalities, e.g., an abnormality of a heart valve.

In some advantageous embodiments, refinements, or variants of embodiments, the second task comprises an estimation of a property (such as a probability, a score or the like) predicting a medical event, a progression of a disease, an outcome or success of a medical therapy based on the medical input image (and potentially additional other input data). Such a property may e.g. be the likelihood for heart failure, a heart attack or a predicted progression of a heart valve disease, a coronary artery disease or a tumor. Furthermore a property may predict an outcome or an event for a medical procedure, such as a structural heart procedure, which is often dependent on complex patient-specific structural and functional properties potentially comprised in (or: indicated by) a medical input image.

According to a third aspect, the invention provides a system configured to perform the method according to the first aspect of the invention. In particular, the system may comprise:

an input interface for receiving an artificial neural network, ANN, and for receiving labelled training samples; a computing device for training learnable parameters of the artificial neural network, ANN; and an output interface for outputting the trained artificial neural network, ANN, after its training.

The artificial neural network, ANN, provided via the input interface, may be an artificial neural network, ANN, initialized with randomized values. It may also be a partially or completely pre-trained artificial neural network. For example, the artificial neural network may have been pre-trained without any supervised entry.

A computing device may be realised as any device, or any means, for computing, in particular for executing a software, an app, or an algorithm. For example, the computing device may comprise at least one processing unit such as at least one central processing unit, CPU, and/or at least one graphics processing unit, GPU, and/or at least one field-programmable gate array, FPGA, and/or at least one application-specific integrated circuit, ASIC and/or any combination of the foregoing. The computing device may further comprise a working memory operatively connected to the at least one processing unit and/or a non-transitory memory operatively connected to the at least one processing unit and/or the working memory. Some, or even all, modules of the system may be implemented by a cloud computing platform.

According to a fourth aspect of the present invention, a method for solving, or providing results for, at least a first task and a second task is provided, comprising the steps of:

providing a trained artificial neural network, the trained artificial neural network comprising at least one capsule layer, wherein each capsule of the at least one capsule layer is configured to output a pose array;

receiving, by the trained artificial neural network, an input;

generating, based on the input, an output array;

wherein the artificial neural network is configured to provide, based on the output array, a result for at least one first task and to further provide, based on at least one entry of at least one capsule of at least one of the at least one capsule layer, a result for at least one second task.

According to a fifth aspect of the present invention, a computer program product is provided which comprises executable program code configured to, when executed, implement a trained artificial neural network, the trained artificial neural network comprising at least one capsule layer, wherein each capsule of the at least one capsule layer is configured to output a pose array;

wherein the trained artificial neural network is further configured to receive an input and to generate, based on the input, an output array;

wherein the artificial neural network is configured to provide, based on the output array, a result for at least one first task and to further provide, based on at least one entry of at least one capsule of at least one of the at least one capsule layer, a result for at least one second task.

According to a sixth aspect of the present invention, a computer program product is provided which comprises program code configured to, when executed, perform the method according to any embodiment according to the first aspect of the present invention.

According to a seventh aspect, the present invention provides a non-transitory computer-readable data storage medium comprising program code configured to, when executed, perform the method according to the first aspect of the present invention.

According to an eighth aspect, the present invention provides a non-transitory computer-readable data storage medium comprising program code configured to, when executed, perform the method according to the fourth aspect of the present invention.

According to a ninth aspect of the present invention, a use of a trained artificial neural network is provided, the trained artificial neural network comprising at least one capsule layer, wherein each capsule of the at least one capsule layer is configured to output a pose array;

wherein the trained artificial neural network is further configured to receive an input and to generate, based on the input, an output array;

wherein the artificial neural network is used to provide, based on the output array, a result for at least one first task and to further provide, based on at least one entry of at least one capsule of at least one of the at least one capsule layer, a result for at least one second task.

According to a tenth aspect of the present invention, structured data is provided which implements a trained artificial neural network, ANN, for use in any of the foregoing aspects. Similarly, embodiments according to the first aspect and/or the third aspect may be configured to provide such structured data.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

In the figures, like reference numerals denote like or functionally like components, unless indicated otherwise.

Figures 1, 2:
FIG. 1 shows a schematic flow diagram of a method according to an embodiment of the first aspect of the present invention.
FIG. 2 schematically illustrates an exemplary artificial neural network, ANN, structure that may be trained according to the method of FIG. 1.

Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION OF THE INVENTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows a schematic flow diagram of a method according to an embodiment of the first aspect of the present invention, i.e. of a computer-implemented method for training an artificial neural network, ANN. The method according to FIG. 1 will also be described with respect to FIG. 2.

FIG. 2 schematically illustrates an exemplary artificial neural network, ANN, structure that may be trained according to the method of FIG. 1.

Referring first to FIG. 1, in a step S10, an artificial neural network, ANN 5, as illustrated in FIG. 2 is provided, wherein the artificial neural network, ANN 5, comprises at least one capsule layer as described in the following in more detail. The artificial neural network, ANN 5, may be provided with pre-trained learnable parameters (e.g. weights and biases for traditional layers of artificial neural networks, ANNs, such as fully connected or convolutional layers) and/or with randomized learnable parameters.

In FIG. 2, the artificial neural network, ANN 5 is provided with an encoder branch 20 (or: downsampling branch) and a decoder branch 30 (or: upsampling branch). Generally (although in some variants this may be different), during the course of an encoder branch 20 the number of features (e.g. pixels or voxels for an image) per channel (e.g. colour channel) is reduced, while the number of channels is increased. Conversely, during the course of a decoder branch 30, the number of channels is reduced while the number of features per channel is increased.

In FIG. 2, an example of an artificial neural network, ANN 5, is given which is designed to receive an input image 1 with the dimensions 128×224 pixels for each of 3 colour channels, i.e. with 128×224×3 pixels in total, as input, in particular as input of the encoder branch 20. The artificial neural network, ANN 5, is further configured such as to output, in particular of the decoder branch 30, an output array 9 (or feature map 9) with 128×224×6 features so that 6 features per original pixel are output. Thus, the artificial neural network, ANN 5, may be designated as one example of a pixel-to-pixel network.

It shall be understood that the elements as shown in FIG. 2 are only intended to better illustrate some of the ideas and mechanisms of the present invention. All of the features described with respect to FIG. 2 may be freely improved or replaced by the addition or exchange with features described elsewhere herein.

In FIG. 2, layers or blocks of layers of the artificial neural network, ANN 5, are depicted as arrows, whereas the feature maps are depicted as cuboids. Features maps may either be standard feature maps, i.e. feature maps as in usual, non-capsule artificial neural networks, or capsule feature maps.

In the artificial neural network, ANN 5, of FIG. 2, the input image 1 is first input into an input block of (standard) convolutional layers 21 which generates a standard feature map 22. As an example, according to FIG. 2 this is done so that the standard feature map 22 has a size of 128×224 features for each of now 20 channels.

Next, the artificial neural network, ANN 5, is configured to transfer the standard feature map 22 to a grouping layer 23. The grouping layer 23 is configured to transform the standard feature map 22 into a first capsule feature map 24-1.

In the example of FIG. 2, this first capsule feature map 24-1 comprises a pose array of size 4 (4 property entries) as well as an explicit activation value (+1) for each of 4 channels and for each of 128×224 features (in a sense corresponding to the pixels or voxels of the input image 1). Apart from the block of convolutional layers 21 and the grouping layer 23, the encoder block 20 further comprises in this example a series of five consecutive convolutional capsule layers 25-1 through 25-5 (hereafter sometimes also collectively referred to as 25-i).

Furthermore, in the example of FIG. 2, the convolutional capsule layers 25-i in the encoder branch 20 are implemented as strided capsule layers with kernel sizes of 3 and strides of 2. However, any other type of downsampling capsule layer as has been described in the foregoing may also be implemented instead.

Figure 3:
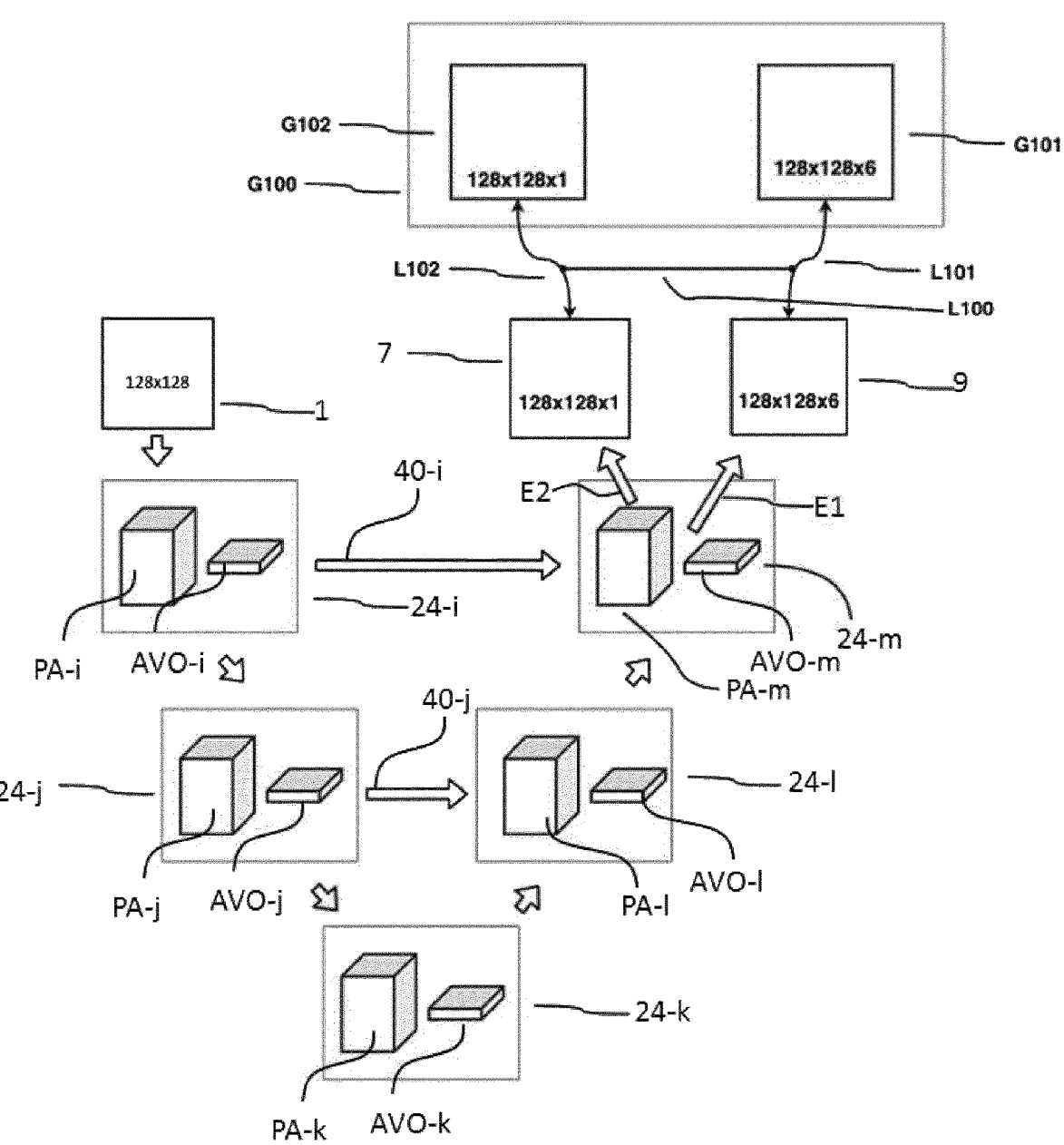
FIG. 3 schematically illustrates another exemplary artificial neural network, ANN, structure that may be trained according to the method of FIG. 1.

FIG. 3 schematically illustrates another exemplary artificial neural network, ANN, structure that may be trained according to the method of FIG. 1, optionally using any or all of the variants, options or refinements described with respect to FIG. 2 in the foregoing, for a more in-depth explanation about the loss function L100 used.

In FIG. 3, the various capsule features maps 24-i, 24-j, 24-k, 24-l, 24-m which are generated indirectly from the input 1 are each shown as containing a pose array PA-i as well as an explicit activation value output AVO-i. Various procedures such as the application of a standard convolutional layer 21, a grouping layer 23 and so on are omitted in FIG. 3 for the sake of conciseness. The skip connections 40-i, 40-j are only schematically shown, just as the encoder branch 20 (here comprising capsule features maps 24-i, 24-j, 24-k) and the decoder branch (including capsule feature maps 24-l, 24-m) are not explicitly drawn. For the corresponding details and explanations, reference is made to FIG. 2.

FIG. 3 focuses on the steps performed on the last capsule feature map 24-m comprising a pose array PA-m and an activation value output AVO-m. For this reason, the description of various specific details of the implementation, which have in any case been presented with respect to FIG. 2 in the foregoing, could be omitted for the description of FIG. 3.

In a step E2, at least one supervised entry is extracted from the pose array PA-m of the last capsule features map 24-m. In the present example, a supervised array 7 of 128×128×1 features is extracted. For example, this array could correspond to a depth map, with the third dimension (" . . . x1") indicating the depth for each pixel of a 128×128 spatial feature array. The extracting E2 may comprise additional processing steps and may be based on the pose array PA-m, and optionally in addition also on the activation value output AVO-m. For example, the supervised array 7 may be generated by providing an entry for each spatial location by selecting a pose array entry with a predefined index (i.e. supervised entry) from the capsule with the highest activation probability corresponding to the same spatial location.

In a step E1, the activation value output AVO-m is processed in order to generated the output array 9. The processing E2 may comprise, for example, grouping using a grouping layer 37, as shown in (as described with respect to) FIG. 2.

Steps E1 and E2 may be performed concurrently, or in sequence. In particular, step E2 may be started before step E1 since generating the pose array PA-m may be finished before generating the activation value output AVO-m is finished.

As is further illustrated in FIG. 3, for each sample of the training data, a ground truth label set G100 is provided. The ground truth label set G100 comprises at least one ground truth label G101 for the output array 9, in this example a ground truth label array G101 of 128×128×6 entries corresponding to the 128×128×6 entries of the output array 9.

The ground truth label set G100 further comprises at least one ground truth label for the at least one supervised entry. In this example, a ground truth label array G102 of 128× 128×1 entries corresponding to the 128×128×1 entries of the supervised array 7 is comprised.

When calculating the loss function L100, a first part L101 of the loss function L100 is calculated which penalized differences between the output array 9 and the ground truth label G101 for the output array 9, and a second part L102 of the loss function L100 is calculated which penalizes differences between the supervised array 7 and the ground truth label array G102 for the supervised entry 7. In each case, "difference" is not restricted to a simple subtraction and may rather comprise, or be based on, any known difference metric such as an L1 norm, an L2 norm (Euclidean metric), an L3 norm, any Lp norm (with p any integer), and/or the like.

Figure 4:
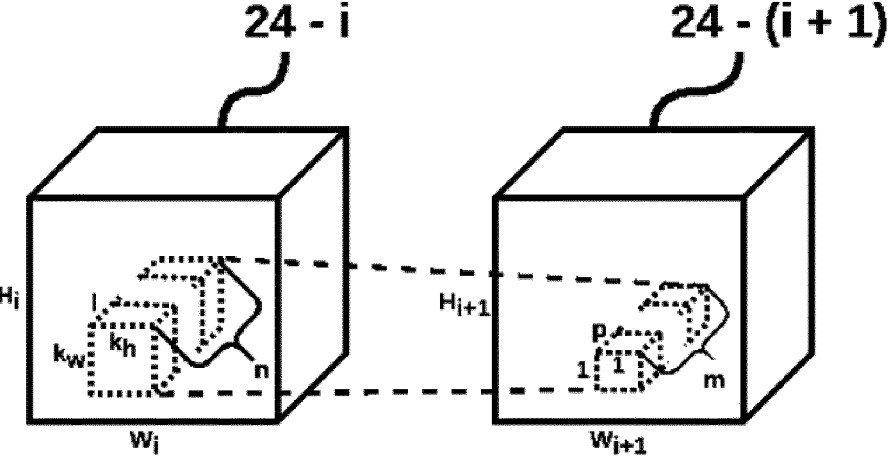
FIG. 4 schematically illustrates optional details of the method of FIG. 1.

FIG. 4 schematically illustrates how a capsule feature map 24-(i+1) may be generated from a capsule feature map 24-i which comprises n capsules per spatial input feature (e.g. pixel or voxel) using a "convolutional capsule layer". Each of the n capsules of feature map 24-i in this example has size 1, wherein 1 may be the dimension of the pose array. FIG. 4 on the left hand side illustrates the feature map 24-i with size $H_i \times W_i \times n$, i.e. with $H_i \times W_i \times n$ features (e.g. corresponding to having n features for every of H×W pixels or voxels of an input image). Similar to a regular convolutional operation, the output at every spatial location is calculated based not on the full input but only on the small portion of input (like a convolutional kernel). For each output pixel, m capsules of size p are calculated based on k×k×n (k times k times n) capsules of size 1.

In case that $k_h$ is chosen as $k_h = H_i$ and $k_w$ is chosen as $k_w = W_i$, the capsule feature map 24-(i+1) will have the size of 1×1 with m capsules. Such a capsule layer may be seen as a fully connected capsule layer. In particular, such a capsule layer is advantageous for performing the final classification in a capsule network.

Figure 5:
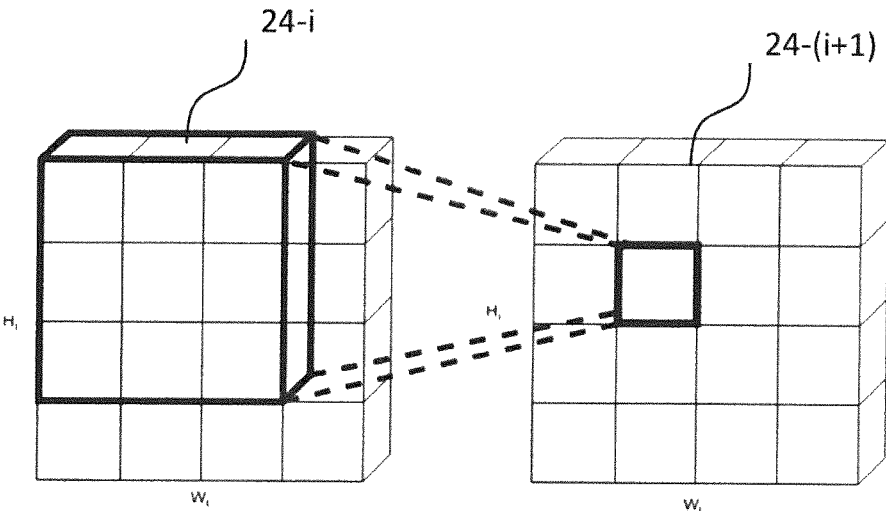
FIG. 5 schematically illustrates alternative optional details of the method of FIG. 1.

FIG. 5 schematically illustrates how a capsule feature map i+1 may be generated from a capsule feature map 24-i which comprises only a single capsule per spatial input feature (e.g. pixel or voxel). A filter kernel, indicated by boldly drawn bars, is applied step-by-step over multiple adjacent input features (or, correspondingly, over the capsules) of the capsule feature map 24-i, and from the capsules captured by each application of the kernel, capsule features of the capsule feature map 24-(i+1) are generated. Compared to the situation of FIG. 4, there is n=1 capsule per pixel in the feature map 24-i and m=1 capsule per pixel in the feature map 24-(i+1).

Referring back to FIG. 2, each convolutional capsule layer 25-*i* produces as its output a corresponding capsule feature map 24-(*i*+1), until the fifth capsule layer 25-5 generates a sixth capsule feature map 24-6.

In FIG. 2, the upper line next to each capsule feature map 24-*i* indicates the number of features for each channel corresponding e.g. to pixels/voxels of a new intermediate image corresponding to a hidden state of the artificial neural network, ANN realized by the artificial neural network, ANN 5. The lower line thereunder indicates the number of capsules per features (e.g. per pixel/voxel) as well as the size of the corresponding output, which in the example of FIG. 2 is always (4+1), indicating a pose array with four property (4) entries plus one activation entry (+1).

The convolutional capsule layers 25-*i* may use padding and/or step sizes and/or an amount of kernels such that the number of features stays constant and/or such that the number of channels stays the same, for example as is all the case for the first convolutional capsule layer 25-1. The convolutional capsule layers 25-*i* may also each use padding and/or step sizes and/or an amount of kernels to change either of these numbers. For example, the second capsule layer 25-2, the third capsule layer 25-3 and the fourth capsule layer 25-4 all reduce the number of features (pixels/voxels in the example) by three quarters while doubling the number of capsules per feature. Finally, the fifth capsule layer 25-5 further reduces the number of features again by three quarters but maintains the number of capsules at 32.

The artificial neural network, ANN 5, is then further configured such that the sixth capsule feature map 24-6 as the end product of the (longest path of the) encoder branch 20 is then fed into the decoder branch 30, in particular into a first upsampling (or: deconvolutional) capsule layer 35-1 which generates a seventh capsule feature map 34-1.

The decoder branch 30 in the present example comprises a consecutive series of four pairs of an upsampling (or: deconvolutional) capsule layer 35-*i* followed directly by a convolutional capsule layer 36-*i*.

In the example of FIG. 2, the upsampling capsule layers 35-*i* are implemented as bilinear upsampling layers. However, any other type of upsampling capsule layer as has been described in the foregoing may also be implemented instead.

The convolutional capsule layers 36-*i* in the decoder branch 30 are implemented as capsule layers with kernel sizes of 3. In these pairs in the artificial neural network, ANN 5, of FIG. 2 the convolutional capsule layers 36-*i* are configured such as to keep the number of features per channel the same between their input and their output, while the number of channels is decreased, specifically halved (convolutional capsule layers 36-1, 36-2, 36-3) or reduced by 60% (convolutional capsule layer 36-4). The upsampling layers 35-*i* increase the number of features (specifically, quadruple them) while at the same time keeping the same number of channels.

The artificial neural network, ANN 5, may also comprise skip connections 40-*i* as shown in FIG. 2. Skip connections may in particular be arranged between a (intermediate) capsule feature map 24-2, 24-3, 24-4, 24-5 that is not the output capsule feature map 24-6 of the encoder branch 20 on one side, and an output of one of the upsampling layers 35-*i*. By each skip connections 40-*i*, a feature map from the encoder branch 20 is concatenated with a respective feature map from the decoder branch 30.

In the embodiment shown in FIG. 2, by a skip connection 40-1, feature map 24-2 output by convolutional capsule layer 25-1 is concatenated with the output of the upsampling layer 35-4 in order to form the feature map 34-7. This concatenation is then input into convolutional capsule layer 36-4. By a skip connection 40-2, feature map 24-3 output by convolutional capsule layer 25-2 is concatenated the output of the upsampling layer 35-3 in order to form the feature map 34-5. This concatenation is then input into convolutional capsule layer 36-3. By a skip connection 40-3, feature map 24-4 output by convolutional capsule layer 25-3 is concatenated with the output of the upsampling layer 35-2 in order to form the feature map 34-3. This concatenation is then input into convolutional capsule layer 36-2. By a skip connection 40-4, feature map 24-5 output by convolutional capsule layer 25-4 is concatenated with the output of the upsampling layer 35-1 in order to form the feature map 34-1. This concatenation is then input into convolutional capsule layer 36-1.

As is also evident from FIG. 2, the feature maps to be concatenated have the same number of spatial features, which stays the same after concatenation, while the number of capsules is added up.

The sequence of pairs of upsampling/convolutional layers 35-*i*/36-*i* are followed by another convolutional capsule layer 36-5 which generates a ninth and final capsule feature map 34-9. The artificial neural network, ANN 5, further comprises a grouping layer 37 in which the final selection of activation probabilities and pose entries is performed which then yields the output array 9. As is indicated in FIG. 2, the grouping layer 37 maintains the number of spatial features (pixels), here: six.

For example, the input image 1 may be a camera picture of a traffic scene, and the six channels of the output array 9 may indicate, for each pixel of the input image 1, whether it belongs to one of five classes or to a background. In this way, the output array 9 may solve a first task, specifically a segmentation task, i.e. segmenting the input image 1 into different classes.

When the input image 1 is a medical image such as a magnetic resonance, MR, image, a computed tomography, CT, image, an x-ray image, an ultrasound image and/or the like, the first task may be a segmentation mask for classifying the pixels of the input image 1 into classes corresponding to different internal organs, or parts or portions of organs.

For example, when the input image 1 is a medical image of a human heart, the classes indicated in the output array 9 may indicate different parts or portions of it (e.g. left and right ventricle, left and right atrium, valves, leaflets and/or the like).

Each of the capsules of all of the capsule layers of the artificial neural network, ANN 5, is configured to output a pose array; as indicated in FIG. 2, these may all have the same dimension (here: 4) but may also have different dimensions.

Referring back to FIG. 1, in a step S20, the artificial neural network, ANN 5 is trained.

During training, labelled training samples are provided as input to the ANN 5, i.e. images (in this example with height 128 pixels, width 224 pixels and 3 colour channels) to which labels are available are input into the input block of convolutional layers 21. The input image may alternatively be 2-dimensional, 3-dimensional or 4-dimensional images (e.g. with greyscale values), in particular medical images from medical imaging techniques.

When the artificial neural network, ANN, is first implemented with the ANN 5, its learnable parameters may be randomly initialized. In iterative training steps, the learnable parameters of the artificial neural network, ANN, are then updated to minimize a loss function. Learnable parameters include in particular parameters within the kernels of the different types of convolutional layers and transformation matrices of the capsule layers and/or trainable parameters of the routing procedures and/or the like.

The loss function penalizes differences between at least one entry (preferably all of the entries), of the output array 9 generated based on each training sample and a corresponding ground truth label for said at least one entry (preferably, again, all entries) of the corresponding training sample. As has been described in the foregoing, based on the output array 9, or preferably by the output array 9 as a whole, a first task is solved, in particular a first medical task such as a diagnostic or prediction task. For example, for a segmentation task as the first task, the labels of the training samples may comprise ground truth labels that may indicate for each pixel of the image to which class it belongs —and thus, to which class that pixel should ideally be classified by the fully trained artificial neural network, ANN.

Furthermore, in accordance with one of the main ideas of the present invention, the labelled training samples (or at least one of the labelled training samples) further comprise a ground truth label for at least one supervised entry of the pose array of at least one capsule of at least one capsule layer of the artificial neural network, ANN 5. The supervised entry is used to perform a second task, preferably a task that is in some way connected to the first task. As has been described in the foregoing, a supervised entry is an entry of the pose array for which the loss function penalizes differences between the ground truth label for said at least one supervised entry for at least one, preferably each, training sample and the value for said at least one supervised entry generated by the artificial neural network, ANN, based on the corresponding training sample. The supervised entry may be at least one of the pose property features of the pose array.

The capsule which output, possibly among other pose property features and/or activation probability values, the supervised entry, may also be designated as a supervised capsule, and the capsule layer comprising the supervised capsule may also be designated as a supervised capsule layer.

Thus, in other words, according to the invention, the artificial neural network, ANN 5, preferably a deep (artificial) neural network, DNN, comprises at least one supervised capsule layer. How many capsule layers are provided, how many supervised capsules are provided in each supervised capsule layer and how many of the pose property features of each supervised capsule are then supervised entries may depend on the specific application at hand.

For example, when the artificial neural network, ANN 5, is designed to output a segmentation for the input image 1, wherein each pixel of the input image 1 is classified into a background or one of a plurality of classes, then the first task is image segmentation of the input image 1. Then, in addition, one of the pose property features of each capsule of the capsule layer 36-5 which generates the final capsule feature map 34-9 may be a supervised entry trained to provide a depth map value for one particular pixel. Thus, the entirety of the supervised entries of all of the capsules of the capsule layer 36-5 yields a depth map for the entire input image 1.

Moreover, the supervised entry will aid in the classification: for example, it may be difficult to decide during the inference stage in a particular case for a particular artificial neural network, ANN, whether one particular pixel belongs to class A or class B. However, if, due to the training, it has straightforward to generate the depth map value for said pixel in the supervised entry, the decision on class A or class B may be supported by the knowledge of this depth map value.

For example, if the depth map value is very different from the ones of pixels of class A in the vicinity and much the same as the ones of pixels of class B in the vicinity, the decision for class B is supported. In more technical terms, the biasing of the supervised entry to correspond to a depth map value causes the pose array which comprises the supervised entry to take on a particular form, i.e. an encoding pattern where the depth map value is one of the pose property features.

Figure 6:
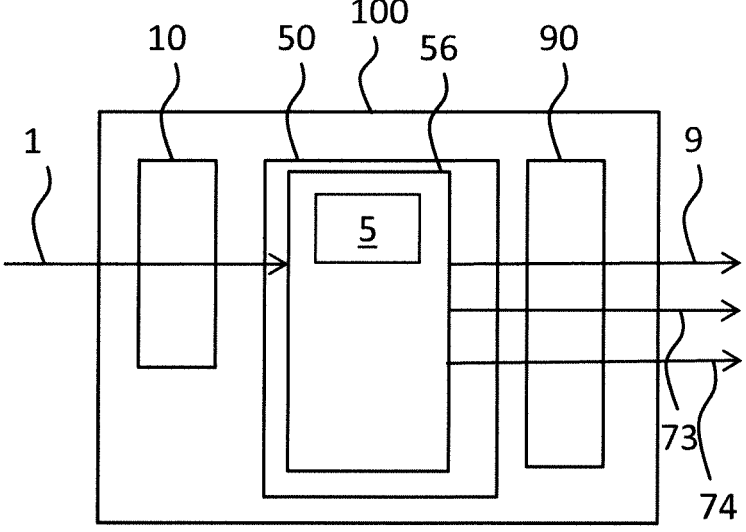
FIG. 6 schematically shows a schematic block diagram illustrating a system according to an embodiment of the second aspect of the present invention.

FIG. 6 shows a schematic block diagram illustrating a system 100 according to an embodiment of the second aspect of the present invention. Thus, FIG. 6 shows a schematic block diagram of a system 100 for providing results for at least a first task and a second task.

The system 100 comprises an input interface 10 configured to receive an input 1, preferably an image, more preferably a medical image, most preferably a computed tomography, CT, image.

The system 100 also comprises a computing device 50 configured to implement a trained artificial neural network, 5. The computing device 50 may comprise a dedicated machine learning algorithm, MLA, module 56 configured to implement the trained artificial neural network 5, e.g. as has been described with respect to FIG. 1 through 4. The computing device 50 may comprise one or more central processing units, CPU, and/or one or more graphics processing units, GPU, for running the MLA module 56 for implementing the trained artificial neural network 5.

The MLA module 56 may in particular be realized as software run by the computing device 50, wherein said software may be stored in a non-transitory data storage of the computing device 50 and may be run in a working memory of the computing device 50.

The artificial neural network 5 itself as well as the MLA module 56 may also be provided separately, e.g. on a non-transitory computer-readable data storage medium, as a type of structured data. The structured data may be received by the computing device 50 and may then be run by the computing device 50, using the working memory of the computing device 50. The structured data may be received via a CD-ROM, a DVD-ROM, a Blu-Ray disc, a solid state drive, a solid-state memory stick and/or the like.

The artificial neural network 5 comprises at least one capsule layer 25-*i*, 35-*i*, 36-*i*, and each capsule of the at least one capsule layer 25-*i*, 35-*i*, 36-*i* is configured to output a pose array. In some variants, some or even all of the capsules may output an explicit activation value in addition to the pose array.

The computing device 50 is configured to receive the input 1 from the input interface 10 and to feed it into the trained artificial neural network 5 (e.g. to transmit it to the MLA module 56). The artificial neural network 5 in turn is configured to receive the input 1 and to output, based thereon, an output array 9. The artificial neural network 5 is further configured to provide (or: enable), based on the output array 9, a result 73 for at least one first task and to further provide, based on at least one entry of at least one capsule of at least one of the at least one capsule layer, a result for at least one second task 74.

The output array 9 and the result 73 for the at least one first task may be one and the same, for example, when the first task is to provide a segmentation and the output array 9 is a dataset providing such a segmentation of an input image as input 1. In this case, outputting the output array 9 is coincidental with outputting the result 73.

The output array 9 and the result 73 for the at least one first task may also be separate, for example when the first task is to determine a likelihood that, based on a medical image as input 1, a particular patient develops a particular disease, and when the output array 9 indicates corresponding likelihoods for a plurality of diseases and/or medical conditions. In this case, outputting the output array 9 comprises outputting the result 73.

One of the main ideas of this application is to provide an artificial neural network 5 such that at least one entry ("supervised entry") of a pose array output by one of the capsules of the artificial neural network 5 is "interpretable" in the sense that it relates to an actual physical or medical property instead of merely to an activation value of a node. For example, the second task may be to provide three-dimensional information to a two-dimensional input image as input 1, and the supervised entries of a plurality of capsules may provide depth map values for each of a plurality of pixels of the input image. Thus, outputting the plurality of values of the supervised entries equals outputting the result 74 to the second task in this case.

The system 100 further comprises an output interface 90 for outputting the output array 9, the result 73 for the at least one first task and/or the result 74 for the at least one second task.

The artificial neural network 5 may be configured such as has been described in detail in the foregoing, in particular with respect to FIG. 1 through FIG. 5 and/or according to any variant or modification thereof, and vice versa.

Figure 7:
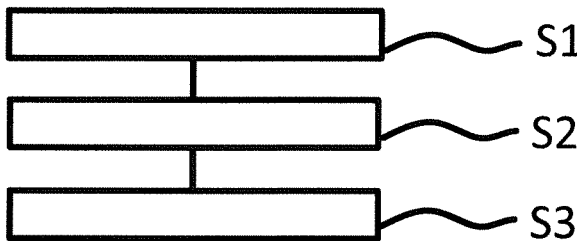
FIG. 7 shows a schematic flow diagram illustrating a method according to any embodiment of the fourth aspect of the present invention.

FIG. 7 shows a schematic flow diagram illustrating a method according to any embodiment of the fourth aspect of the present invention.

In a step S1, a trained artificial neural network 5 is provided, preferably a trained artificial neural network 5 as it has been described in the summary of the invention or as it has been described with respect to FIG. 1 through 4. The trained artificial neural network 5 comprises at least one capsule layer, wherein each capsule of the at least one capsule layer is configured to output a pose array.

In a step S2, the trained artificial neural network receives an input 1, preferably an image, more preferably a medical image, still more preferably a 2-dimensional or 3-dimensional medical image, yet more preferably a computed tomography, CT, image.

In a step S3, an output array 9 is generated based on the input 9. The artificial neural network 5 is configured to provide, based on the output array 9, a result 73 for at least one first task and to further provide, based on at least one entry of at least one capsule of at least one of the at least one capsule layer, a result for at least one second task 74, for example as has been described in the foregoing with respect to FIG. 6.

Figure 8:
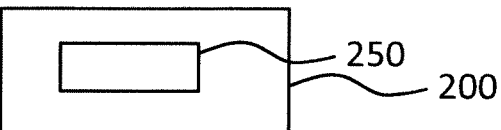
FIG. 8 shows a schematic block diagram illustrating a computer program product according to an embodiment of the fifth or the sixth aspect of the invention.

FIG. 8 shows a schematic block diagram illustrating a computer program product 200 according to an embodiment of the fifth aspect or of the sixth aspect of the present invention. The computer program product 200 comprises executable program code 250 configured to, when executed by a computing device (e.g. computing device 50 of system 100), to perform the method according to any embodiment of the first aspect of the invention, in particular as it has been explained in the summary of the invention or as it has been described with respect to FIG. 1 through FIG. 5.

The executable program code 250 may also be configured to, when executed by a computing device (e.g. computing device 50 of system 100), to perform the method according to any embodiment of the fourth aspect of the present invention, in particular as it has been described with respect to FIG. 7.

Figure 9:
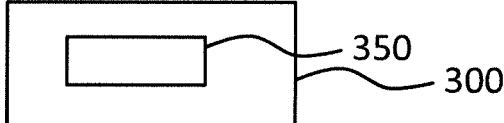
FIG. 9 shows a schematic block diagram illustrating a computer program product according to an embodiment of the seventh or the eighth aspect of the invention.

FIG. 9 shows a schematic block diagram illustrating a non-transitory, computer-readable data storage medium 300 according to an embodiment of the seventh aspect of the present invention or according to an embodiment of the eight aspect of the present invention. The data storage medium 300 comprises executable program code 350 configured to, when executed by a computing device (such as computing device 50 of system 100), to perform the method according to any embodiment of the first aspect of the present invention, in particular the method as it has been described in the summary of the invention or as it has been described with respect to FIG. 1 through FIG. 5.

Alternatively or additionally, the data storage medium 300 comprises executable program code 350 configured to, when executed by a computing device (e.g. computing device 50 of system 100), to perform the method according any embodiment of the fourth aspect of the present invention.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A computing system for providing results for at least a first task and a second task, comprising:
    a computing device configured to implement a trained artificial neural network,
    the trained artificial neural network, ANN, comprising at least one capsule layer, wherein each capsule of the at least one capsule layer is configured to output a pose array;
    wherein the trained artificial neural network, ANN, is further configured to receive an input and to generate, based on the input, an output array;
    wherein the trained artificial neural network, ANN, is configured to provide, based on the output array, a result for at least one first task and to further provide, based on at least one entry of at least one capsule of at least one of the at least one capsule layer, a result for at least one second task different from said first task.

2. The system of claim 1, wherein the input is at least one medical input image, and wherein the first task comprises a medical image classification task on the medical input image and/or a medical image segmentation task on the medical input image.

3. The system of claim 2, wherein the at least one second task comprises generating a depth map for at least part of the at least one medical input image.

4. The system of claim 1, wherein the at least one second task comprises a detection of an abnormality and/or disease within the input.

5. The system of claim 1, wherein the input is at least one input image, wherein the at least one second task comprises an estimation of a flow characteristic of at least one blood vessel within the input image or for at least one pixel or voxel of such a blood vessel within the input image.

6. The system of claim 1, wherein the input is at least one input image, wherein the second task comprises an estimation of a tissue characteristic of at least one tissue within the input image or for at least one pixel or voxel of such a tissue within the input image.

7. The system of claim 1, wherein the input is at least one input image, wherein the at least one second task comprises estimation of corners of at least one object bounding box of at least one object in an input image.

8. The system of claim 1, wherein the input is at least one medical input image, wherein the first task comprises detection and/or localisation of an abnormality and/or disease within the medical input image, and wherein the second task comprises determining and/or estimating a property of the abnormality and/or disease.

9. A non-transitory computer readable storage medium having a computer program stored thereon, wherein when the computer program is executed by a processor, the computer program product comprising: executable program code configured to, when executed, implement a trained artificial neural network, ANN, the trained artificial neural network comprising at least one capsule layer, wherein each capsule of the at least one capsule layer is configured to output a pose array;

wherein the trained artificial neural network, ANN, is further configured to receive an input and to generate, based on the input, an output array;

wherein the artificial neural network, ANN, is configured to provide, based on the output array, a result for at least one first task and to further provide, based on at least one entry of at least one capsule of at least one of the at least one capsule layer, a result for at least one second task different from said first task.

10. The non-transitory computer readable storage medium of claim 9, wherein the input is at least one medical input image, and wherein the first task comprises a medical image classification task on the medical input image and/or a medical image segmentation task on the medical input image.

11. The non-transitory computer readable storage medium of claim 10, wherein the at least one second task comprises generating a depth map for at least part of the at least one medical input image.

12. The non-transitory computer readable storage medium of claim 9, wherein the at least one second task comprises a detection of an abnormality and/or disease within the input.

13. The non-transitory computer readable storage medium of claim 9, wherein the input is at least one input image, wherein the at least one second task comprises an estimation of a flow characteristic of at least one blood vessel within the input image or for at least one pixel or voxel of such a blood vessel within the input image.

14. The non-transitory computer readable storage medium of claim 9, wherein the input is at least one input image, wherein the second task comprises an estimation of a tissue characteristic of at least one tissue within the input image or for at least one pixel or voxel of such a tissue within the input image.

15. The non-transitory computer readable storage medium of claim 9, wherein the input is at least one input image, wherein the at least one second task comprises estimation of corners of at least one object bounding box of at least one object in an input image.

16. The non-transitory computer readable storage medium of claim 9, wherein the input is at least one medical input image, wherein the first task comprises detection and/or localisation of an abnormality and/or disease within the medical input image, and wherein the second task comprises determining and/or estimating a property of the abnormality and/or disease.

* * * * *